United States Patent
Wang et al.

(10) Patent No.: US 8,315,519 B2
(45) Date of Patent: Nov. 20, 2012

(54) SYSTEMS AND METHODS FOR TRANSMITTING SIGNALS IN COMMUNICATION NETWORKS

(75) Inventors: Chonggang Wang, Plainsboro, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 469 days.

(21) Appl. No.: 12/701,175

(22) Filed: Feb. 5, 2010

(65) Prior Publication Data
US 2010/0310257 A1 Dec. 9, 2010

Related U.S. Application Data

(60) Provisional application No. 61/183,742, filed on Jun. 3, 2009.

(51) Int. Cl.
*H04B 10/00* (2006.01)
(52) U.S. Cl. ........... 398/57; 398/115; 398/118; 398/129
(58) Field of Classification Search ............ 398/57, 398/115, 118, 129
See application file for complete search history.

(56) References Cited

U.S. PATENT DOCUMENTS

| | | | |
|---|---|---|---|
| 6,657,964 B1 * | 12/2003 | Kohzuki et al. | 370/236.1 |
| 7,047,316 B2 * | 5/2006 | Iwata et al. | 709/240 |
| 7,099,277 B2 * | 8/2006 | Sahinoglu et al. | 370/238 |
| 7,406,032 B2 * | 7/2008 | Li et al. | 370/217 |
| 7,451,340 B2 * | 11/2008 | Doshi et al. | 714/47.2 |
| 7,500,013 B2 * | 3/2009 | Dziong et al. | 709/238 |
| 7,590,149 B1 * | 9/2009 | Bharali et al. | 370/468 |

OTHER PUBLICATIONS

Sivathasan, S. et al., "RF/FSO Wireless Sensor Networks: A Performance Study", IEEE Globecom 2008 Proceedings.
Sivathasan, S et al., "Lifetime Comparison of RF-only and Hybrid RF/FSO Wireless Sensor Networks", Proceedings of the International Conference on Computer and Communication Engineering, May 13-15, 2008, Kuala Lumpur, Malayasia.

* cited by examiner

*Primary Examiner* — Danny Leung
(74) *Attorney, Agent, or Firm* — Joseph Kolodka

(57) ABSTRACT

For each path in a first plurality of paths in said communication network, a respective first weighted path length is determined based at least in part on a number of pure wireless links in the path. From among the first plurality of paths, a second plurality of paths having first weighted path lengths less than a threshold value is selected. For each path in the second plurality, a respective second weighted path length is determined based at least in part on a number of pure optical links in the path, and from among the second plurality of paths, a transmission path is selected having a highest second weighted path length. Information is transmitted via the transmission path.

20 Claims, 6 Drawing Sheets

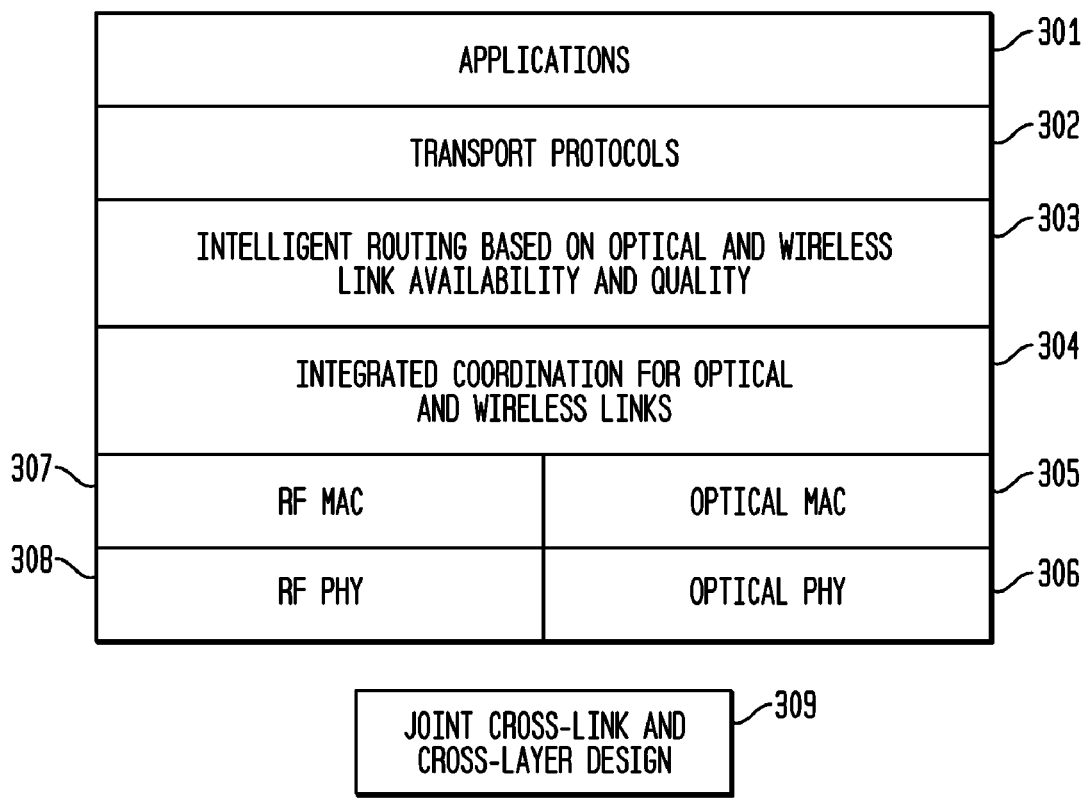

SYSTEMS AND METHODS FOR TRANSMITTING SIGNALS IN COMMUNICATION NETWORKS

RELATED APPLICATIONS

This application claims the benefit of U.S. Provisional Application No. 61/183,742 filed on Jun. 3, 2009, which is incorporated herein by reference.

BACKGROUND OF THE INVENTION

The present invention relates generally to systems and methods for transmitting signals in communication networks. More particularly, systems and methods for transmitting signals in sensor networks are provided.

Sensor networks are increasingly used as a cost effective technology for transmitting information within broadband sensor communication infrastructures. Sensor networks have been used in many applications such as environment monitoring and control. Many sensor networks use wireless/radio frequency (RF) transmission for communications and are referred to as Wireless Sensor Networks (WSN).

A wireless sensor network (WSN) is generally composed of one or more sinks (or base stations) and tens or thousands of sensor nodes scattered in a physical space. With the integration of information sensing, computation, and wireless communication capabilities, the sensor nodes can sense physical information, process the sensed information, and report the processed information to the sink. The sink can query information and even control the behavior of the sensor nodes. A WSN can be used to monitor events and collect data in some special environments where other networks are difficult or costly to be deployed. Other sensor networks include optical technology for communications and form Free-Space Optical Sensor Networks (FSOSN).

BRIEF SUMMARY OF THE INVENTION

In an embodiment of the invention, a method of transmitting information via a communication network that comprises a plurality of nodes and a plurality of links between nodes, the plurality of links comprising at least one optical link and at least one wireless link, is provided. The method comprises determining, for each path in a first plurality of paths in said communication network, a respective first weighted path length based at least in part on a number of pure wireless links in the path, and selecting, from among the first plurality of paths, a second plurality of paths having first weighted path lengths less than a threshold value. The method further comprises determining, for each path in the second plurality, a respective second weighted path length based at least in part on a number of pure optical links in the path, and selecting, from among the second plurality of paths, a transmission path having a highest second weighted path length. The method also comprises transmitting information via the transmission path.

The communication network may comprise a hybrid free-space optical/radio-frequency communication system. The plurality of nodes may comprises at least one node comprising an RF transceiver and an optical transmitter, at least one node comprising an RF transceiver and an optical receiver, and at least one node comprising an RF transceiver and an optical transceiver.

In one embodiment, the first weighted path length for a respective path equals $w1*N(i)+(1-w1)*Nw(i)$, wherein $w1$ comprises a selected parameter, $N(i)$ equals a total number of links in the respective path, and $Nw(i)$ equals a number of pure wireless links in the respective path. The threshold value equals $\min(Lw(i))*(1+k)$, wherein $Lw(i)$ equals the first weighted path length of the respective path and $k$ comprises a selected parameter. The second weighted path length for a respective path equals $w2*No(i)+(1-w2)*Now(i)$, wherein $w2$ comprises a selected parameter, $No(i)$ equals a number of pure optical links in the respective path, and $Now(i)$ equals a number of hybrid optical and wireless links in the respective path.

In another embodiment of the invention, a method of transmitting information via a communication network that comprises a plurality of nodes and a plurality of links between nodes is provided. The method comprises, for each path in a first plurality of paths in said communication network, performing the following steps. For each link in the respective path: determine a total effective link bandwidth value associated with the respective link, and determine a remaining link bandwidth value associated with the respective link, based on the total effective link bandwidth value associated with the respective link. A remaining path bandwidth value associated with the respective path is determined, based on the remaining link bandwidth values associated with the links in the respective path. The method further comprises selecting from the first plurality of paths a second plurality of paths having remaining path bandwidth values greater than a threshold value, selecting a transmission path from among the second plurality of paths based on one or more characteristics of the paths in the second plurality, and transmitting information via the selected transmission path.

In one embodiment, the remaining link bandwidth value associated with a respective link equals $Br(i,j)=Be(i,j)-\Sigma R(i,j,f)$, wherein $Be(i,j)$ equals the total effective link bandwidth value associated with the respective link and $R(i,j,f)$ is a data rate of a flow on the respective link. The remaining path bandwidth value associated with a respective path equals the minimum remaining link bandwidth value among all the links in the respective path. The threshold value equals a rate requested by a data flow.

In one embodiment, the first weighted path length for a respective path equals $w1*N(i)+(1-w1)*Nw(i)$, wherein $w1$ comprises a first predetermined parameter, $N(i)$ equals a total number of links in the respective path, and $Nw(i)$ equals a number of pure wireless links in the respective path. The threshold value equals $\min(Lw(i))*(1+k)$, wherein $Lw(i)$ equals the first weighted path length of the respective path and $k$ comprises a second predetermined parameter. The second weighted path length for a respective path equals $w2*No(i)+(1-w2)*Now(i)$, wherein $w2$ comprises a third predetermined parameter, $No(i)$ equals a number of pure optical links in the respective path, and $Now(i)$ equals a number of hybrid optical and wireless links in the respective path.

BRIEF DESCRIPTION OF THE DRAWINGS

FIG. 3 is a schematic diagram of a protocol stack, in accordance with an embodiment of the invention;

DETAILED DESCRIPTION

Figure 1A:
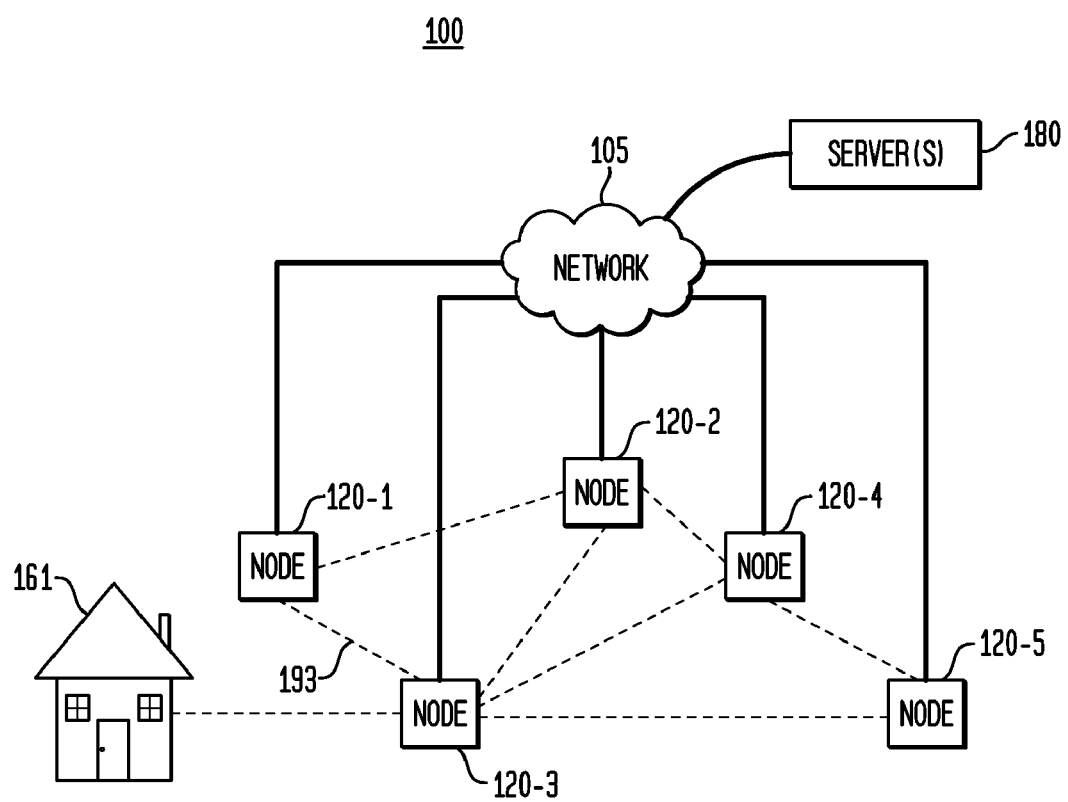
FIG. 1A is an example of a communication system, in accordance with an embodiment of the invention.

Methods and systems described herein may be used in a variety of different types of communication systems. Exemplary embodiments are described below in the context of sensor networks; however, it is to be understood that other types of communication systems may be used.

Many wireless sensor networks (WSNs) are event-oriented and data-centric, have a unique network topology and several distinctive features. Typically, a WSN comprises a network having a plurality of nodes, and a plurality of links between the nodes. The sensor nodes are usually organized in a multi-link star-tree topology, which could be either flat or hierarchical. The sink sitting at the root of the tree plays the role of information collection and relaying to exterior networks. Since the sensor nodes may be mobile, and the wireless links may not always be good enough for establishing normal connection between neighboring nodes, and because the sensor nodes may cease to function due to depletion of energy, the topology of a WSN can be highly variable and dynamic.

WSNs are used in many diverse applications. A WSN can be used to support diverse applications ranging from habitat monitoring and target tracking to security surveillance. These applications may be interested in different sensory data and therefore have different requirements on quality of service (QoS) and reliability. For example, the applications to monitor climate such as temperature and humidity can tolerate certain delivery latency and packet loss; however, for the application to detect fire inside a building, the sensory data should be correctly reported as soon as possible.

In a WSN, traffic usually flows upstream from the sensor nodes to the sink although the sink may occasionally generate certain downstream traffic for the purpose of control and management. The upstream traffic is a kind of many to-one communication compared to that of the peer to-peer (P2P) communications in ad hoc networks. According to the mechanism to trigger data transmission in sensor nodes, the traffic models of different applications can be classified into four types: event-driven delivery, continuous delivery, query-driven delivery, and hybrid delivery. For example, in event-driven delivery, the sensor nodes start event reporting only if the target events (e.g., the temperature is below zero) have been sensed. The sensory data for the events is usually very small in size, e.g., a couple of ten bytes or even one binary bit sometimes.

WSNs, due to characteristics of the RF technology used, may have problems such as radio collision and signal interference. In addition, the broadcast nature of RF makes such technology less secure since RF signals in transmission are susceptible to being overheard by others within the coverage range. These problems can have a significant impact on the performance, quality of service (QoS), and reliability of WSNs.

Free-space optical sensor networks (FSOSN networks) use non-line-of sight (NLOS) optical communications and may provide better security, but have difficulty in providing full network connectivity and coverage, especially under ad hoc mode, due to the NLOS optical communications.

In accordance with embodiments of the invention, an improved sensor network architecture is provided that combines features of wireless RF and optical technologies. In accordance with other embodiments of the invention, improved algorithms for routing and MAC coordination are provided. Examples of embodiments of the invention are described below.

The architecture and protocols described herein provide improved network connectivity and reliability of sensor networks, improved system overall throughput, higher energy-efficiency due to the use of low power-consuming optical transmission and resulting lower number of RF, and better quality of service in terms of data transmission delay.

FIG. 1A is an example of a hybrid free-space optical/radio-frequency (FSO/RF) communication system, in accordance with an exemplary embodiment. Communication system 100 includes a network 105 and plurality of nodes 120-1 through 120-5. Network 105 may comprise an Internet Protocol (IP) network such as the Internet. Nodes 120 comprise RF components and optical components for receiving and transmitting RF signals and optical signals within communication system 100. It is to be understood that while five nodes are shown in FIG. 1A, communication system 100 may comprise more or fewer nodes. Communication system 100 also includes one or more links between nodes, such as link 193. The links between nodes in communication system 100 may include an optical link, or a wireless link, and may include both an optical link and a wireless link. Nodes 120 are also connected to network 105. Communication system 100 also includes one or more servers 180 which execute computer programs that manage aspects of the operation of communication system 100. Server(s) 180 may comprise one or more computers, for example. Communication system 100 may communicate with users, such as user 161.

Figure 1B:
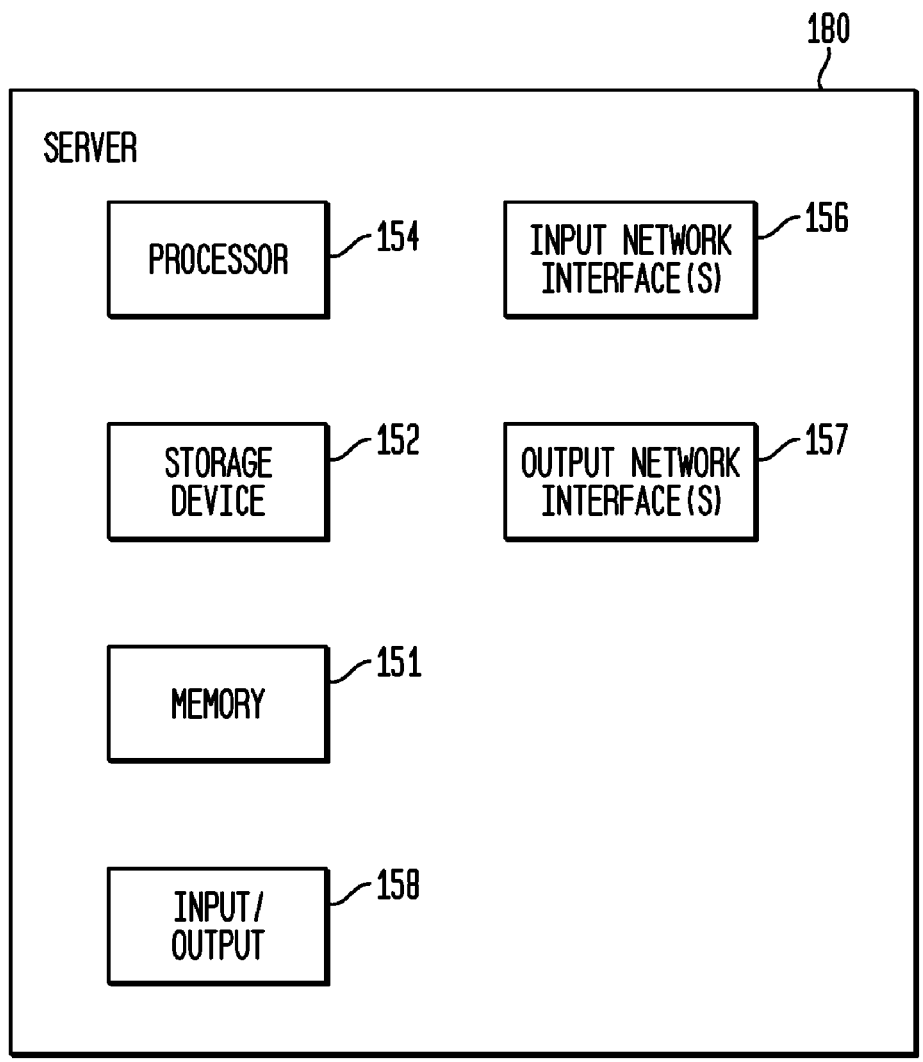
FIG. 1B is a block diagram showing components of a server, in accordance with an embodiment of the invention.

FIG. 1B shows exemplary components of a server 180, in accordance with an embodiment of the invention. Server 180 comprises a processor 154 which controls the overall operation of server 180 by executing computer program instructions which define such operation. Server also comprises a storage device 152 and a memory 151, which may comprise a computer readable medium, such as a magnetic disk, magnetic tape, or optical disk, capable of storing instructions in the form of computer code that may be executed by processor 154 to perform various functions. For example, the computer program instructions may be stored in storage device 152 and loaded into memory 151 when execution of the computer program instructions is desired. Thus, the computer operation will be defined by computer program instructions stored in memory 151 and/or storage 152, and server 180 will be controlled by processor 154 executing the computer program instructions. Server 180 also includes one or more input network interfaces 156 for communicating with other devices via network 105. Server 180 also includes one or more output network interfaces 157 for communicating with other devices. Server 180 also includes input/output 158 which represents devices which allow for user interaction with the server 180 (e.g., display, keyboard, mouse, speakers, buttons, etc.). One skilled in the art will recognize that an implementation of an actual server will contain other components as well, and that FIG. 1B is a high level representation of some of the components of such a server for illustrative purposes.

Figure 2A:
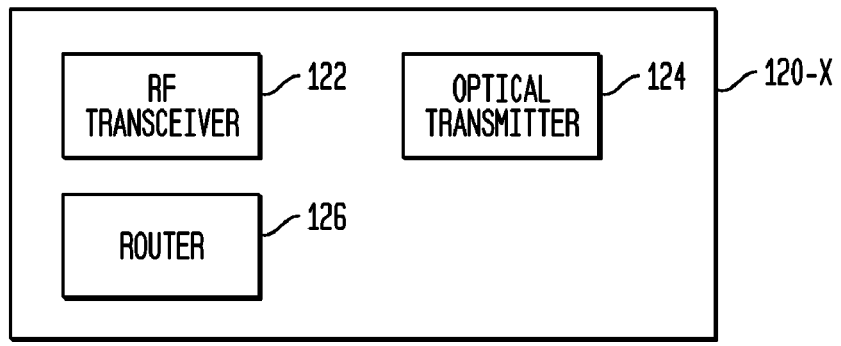
FIGS. 2A-2C are block diagrams showing components of three types of nodes, in accordance with an embodiment of the invention.
Figure 2B:
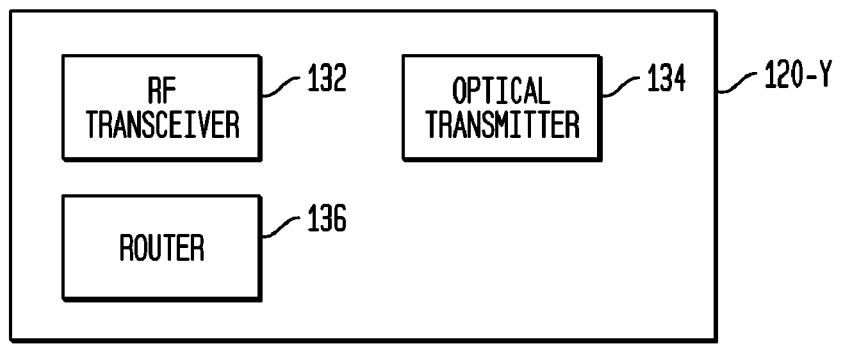
Figure 2C:
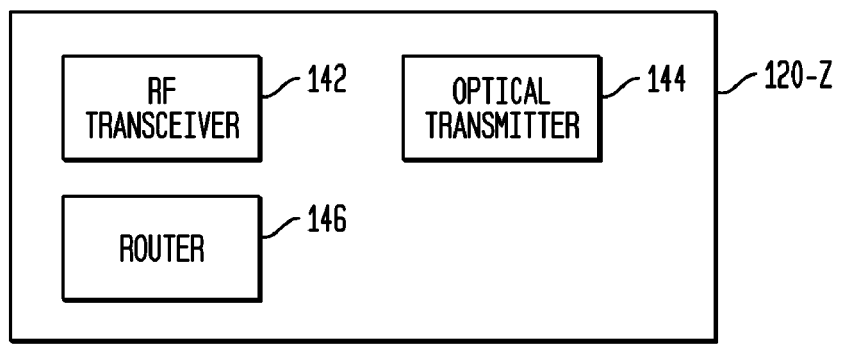

Communication system 100 comprises three types of nodes, as illustrated respectively in FIGS. 2A-2C. A first type of node, illustrated in FIG. 2A as node 120-X, contains an RF transceiver 122, an optical transmitter 124, and a router 126. A second type of node, illustrated in FIG. 2B as node 120-Y, contains an RF transceiver 132, an optical receiver 134, and a router 136. A third type of node, illustrated in FIG. 2C as node 120-Z, contains an RF transceiver 142, an optical transceiver 144, and a router 146. Any number of the first, second type, and third types of nodes may be included in communication system 100. The RF components in the nodes may use 802.15.4 technology, low-power 802.11 technology, and/or other relevant RF air-interface technology. The optical components in the nodes may use wireless optical technology, such as visible light communications (VLC) and/or infrared. Communication system 100 may include other types of nodes.

Routers 126, 136, 146 communicate with servers(s) 180 via network 105. Network 105 may comprises an intranet, an Internet, a wide area network (WAN), an Ethernet, or other type of network.

The RF components in each node 120 communicate with other RF components in other nodes, and the optical components in each node 120 communicate with other optical components in other nodes. For example, referring to dashed line 193 in FIG. 1, an RF transceiver in node 120-1 may communicate with an RF transceiver in node 120-3, and an optical transmitter in node 120-1 may communicate with an optical transceiver in node 120-3. In addition, the RF components and optical components in a node may communicate with users, such as user 161, as shown in FIG. 1.

Nodes 120 may be constructed as a linear, tree, or ad hoc network. In accordance with embodiments of the invention, a routing protocol described herein may be used. A medium access control (MAC) coordination algorithm described herein may be used to schedule links and determine when to use which link at every sensor node.

In accordance with an embodiment of the invention, communications in communication system 100 utilize an improved protocol described herein. FIG. 3 is a schematic diagram of a protocol stack 300, in accordance with an embodiment of the invention. Layer 301 specifies applications. Layer 302 specifies transport protocols. Layer 303 specifies intelligent routing based on optical and wireless link availability and quality. Layer 304 specifies integrated coordination for optical and wireless links. Layer 305 specifies optical MAC. Layer 306 specifies optical PHY. Layer 307 specifies RF MAC. Layer 308 specifies RF PHY. Layer 309 specifies joint cross-link and cross-layer design.

In embodiments of the invention, one or more routing algorithms that select a path based on optical and wireless link availability and quality information are used to transmit signals in communication system 100. The algorithms described herein are different from the traditional "shortest path first" strategy, which is commonly used. In some embodiments, coordinator 304 between routing layer 303 and MAC layer 305/307 may coordinate data transmission over RF and optical links. The architecture and protocols described herein enable quality-aware cross-link optimization between optical links and wireless links.

In accordance with embodiments of the invention, when a node has both an optical link and a wireless link to its next neighboring node, and is allowed to use either link, it uses the following quality-aware cross-link optimization: it transmits each single packet currently over both the wireless link and the optical link to utilize link diversity to improve the performance. If one link is not available, the node can automatically switch to another link.

In accordance with an embodiment of the invention, an algorithm is used to select an optimal path within communication system 100 to use to route data signals from a source sensor node to a sink base based on optical and wireless link availability and quality. The algorithm identifies three kinds of links in communication system 100—pure optical links, pure wireless links, and hybrid optical wireless links. If there is only an optical link existing between two neighboring nodes, the link is deemed a pure optical link. If there is only a wireless link existing between two neighboring nodes, the link is deemed a pure wireless link. If both an optical link and a wireless link exist between two neighboring nodes, the link is deemed a hybrid optical wireless link.

The algorithm identifies available paths from a source sensor to a sink by identifying available combinations of one or more communication links between the source sensor and the sink. The algorithm attempts to select the path with the fewest number of links, with more optical links, and/or the fewest number of active neighboring nodes. A path having fewer links requires fewer transmissions and may be more energy-efficient. A path having more optical links may be desirable as it implies more opportunities to send data over optical links rather than radio links, reducing the risk of radio collisions and reducing potential radio interference. More optical links may also improve throughput and be more energy-efficient as well. A path having fewer active neighboring nodes may be desirable as it may avoid potential congestion and increase overall system throughput.

Figure 4:
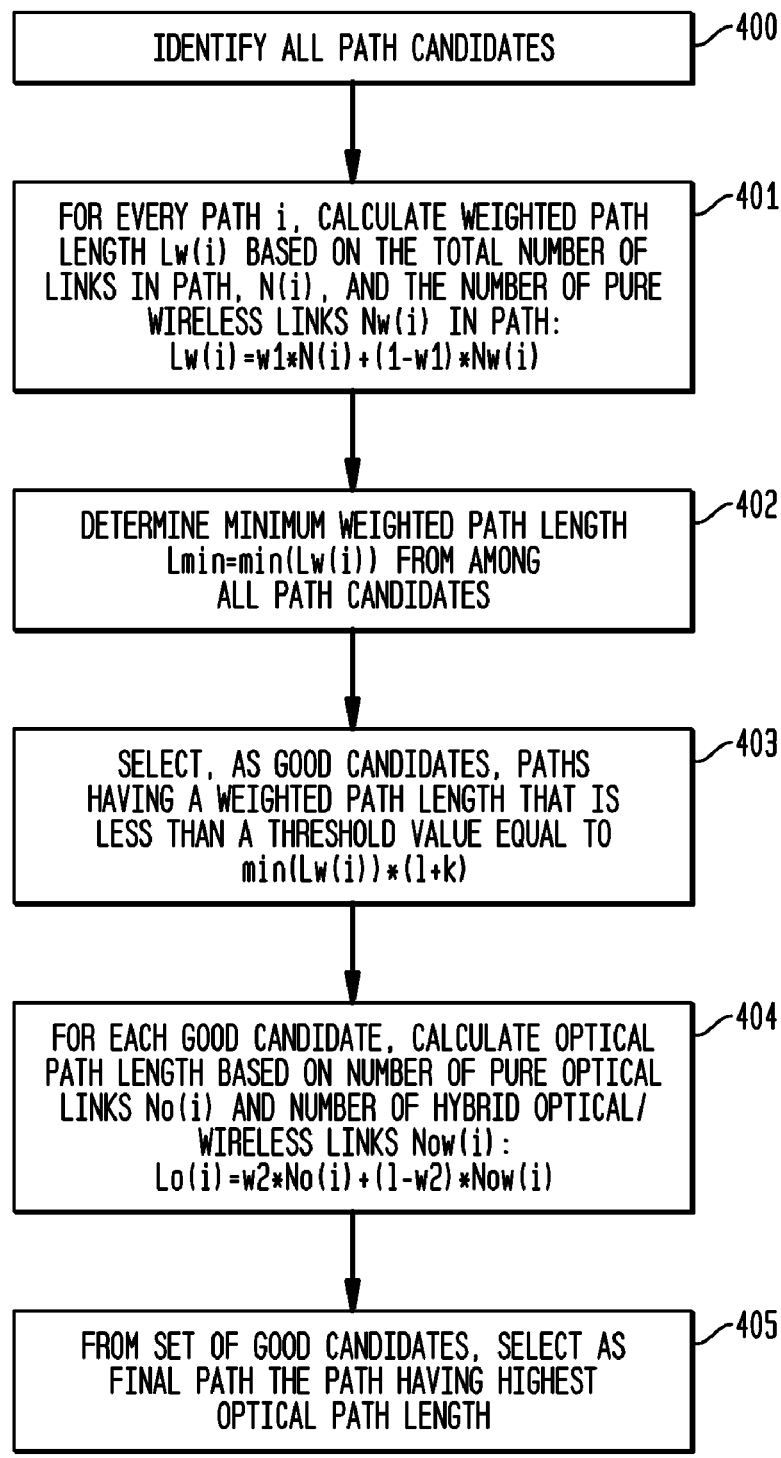
FIG. 4 is a flowchart depicting a method to transmit information in a communication system, in accordance with an embodiment of the invention.

FIG. 4 is a flowchart depicting a method to transmit information in communication system 100, in accordance with an embodiment of the invention. At step 400, all path candidates in communication system 100 are identified. Suppose each path i consists of $N(i)$ transmitting nodes including the source node and intermediate nodes and $N(i)$ links accordingly. Each link may be a pure optical link, a pure wireless link, or a hybrid optical wireless link. In the discussion below, for each path i, $No(i)$ is the number of pure optical links along the path, $Nw(i)$ is the number of pure wireless links along the path, and $Now(i)$ is the number of hybrid optical and wireless links along the path. Therefore, $N(i)=No(i)+Nw(i)+Now(i)$.

At step 401, for every path i, a weighted path length $Lw(i)$ is calculated based on the Total Number of Links in the Path, $N(i)$, and the Number of Pure Wireless Links $Nw(i)$ in the Path. In the exemplary embodiment, $Lw(i)=w1*N(i)+(1-w1)*Nw(i)$. In the exemplary embodiment, w1 is a design parameter having a value between 0 and 1.0.

At step 402, the minimum weighted path length among all paths ($Lmin=min(Lw(i))$) is determined. At step 403, paths having a weighted path length less than a selected value are selected as good candidates. For example, paths whose weighted path length $Lw(i)$ are smaller than "$min(Lw(i))*(1+k)$" may be selected as good candidates, where k is another design parameter. In one example, k is less than 1.0. In another embodiment, paths having a weighted path length that differs from the minimum weighted path length by less than a predetermined amount are selected as good candidates.

At step 404, for each good candidate selected at step 403, an optical path length is calculated based on the number of pure optical links $No(i)$ and the number of hybrid optical/wireless links. In one example, $Now(i)$: $Lo(i)=w2*No(i)+(1-w2)*Now(i)$, where w2 is a design parameter between 0 and 1.0.

At step 405, the path having the highest optical path length $Lo(i)$ is selected from among the set of good candidates as the final path. Information, such as a signal, is transmitted via the final path.

In an embodiment of the invention, some or all of the steps described in FIG. 4 are performed by server 180. In some embodiments, the method steps described in FIG. 4 are defined by computer program instructions that are stored in memory 151 of server 180 and executed by processor 154. In one example, computer program instructions stored in memory 151 are implemented as computer executable code appropriately programmed by one skilled in the art to perform the algorithm defined by the method steps described in FIG. 4. By executing the computer program instructions, processor 154 executes the algorithm defined by the method steps of FIG. 4. In other embodiments, one or more of routers 126, 136, 146 may perform some or all of the steps described in FIG. 4.

In another embodiment of the invention, a routing algorithm that considers link quality is used to transmit signals in communication system 100. This algorithm may be used, for example for data flows that need a certain bandwidth. First, a remaining bandwidth (Br(i,j)) is calculated for each link j along a path i, based on the total effective bandwidth (Be(i,j)) on the same link. For a pure optical link, a total effective bandwidth Be(i,j) is determined by the link quality. For a pure wireless link, a total effective bandwidth Be(i,j) is dependent on both link quality and the number of neighboring radio nodes, since more neighboring nodes results in more MAC layer overhead and radio collisions and lower effective bandwidth. Existing theoretical results can be utilized to capture this effect. For a hybrid optical and wireless link, Be(i,j) is calculated by adding the effective bandwidth of the optical link and that of the wireless link. Once Be(i,j) is obtained, Br(i,j) is calculated as Br(i,j)=Be(i,j)−ΣR(i,j,f), where Nf(i,j) is the number of flows and R(i,j,f) is the data rate of flow f on the link j along the path i. Then, paths whose remaining bandwidth is higher than the bandwidth the flow is requesting are selected as qualified candidates. Finally, the qualified candidates are analyzed using the method described in FIG. 4 to determine the final path. Information, such as a signal, is transmitted via the final path.

Figure 5:
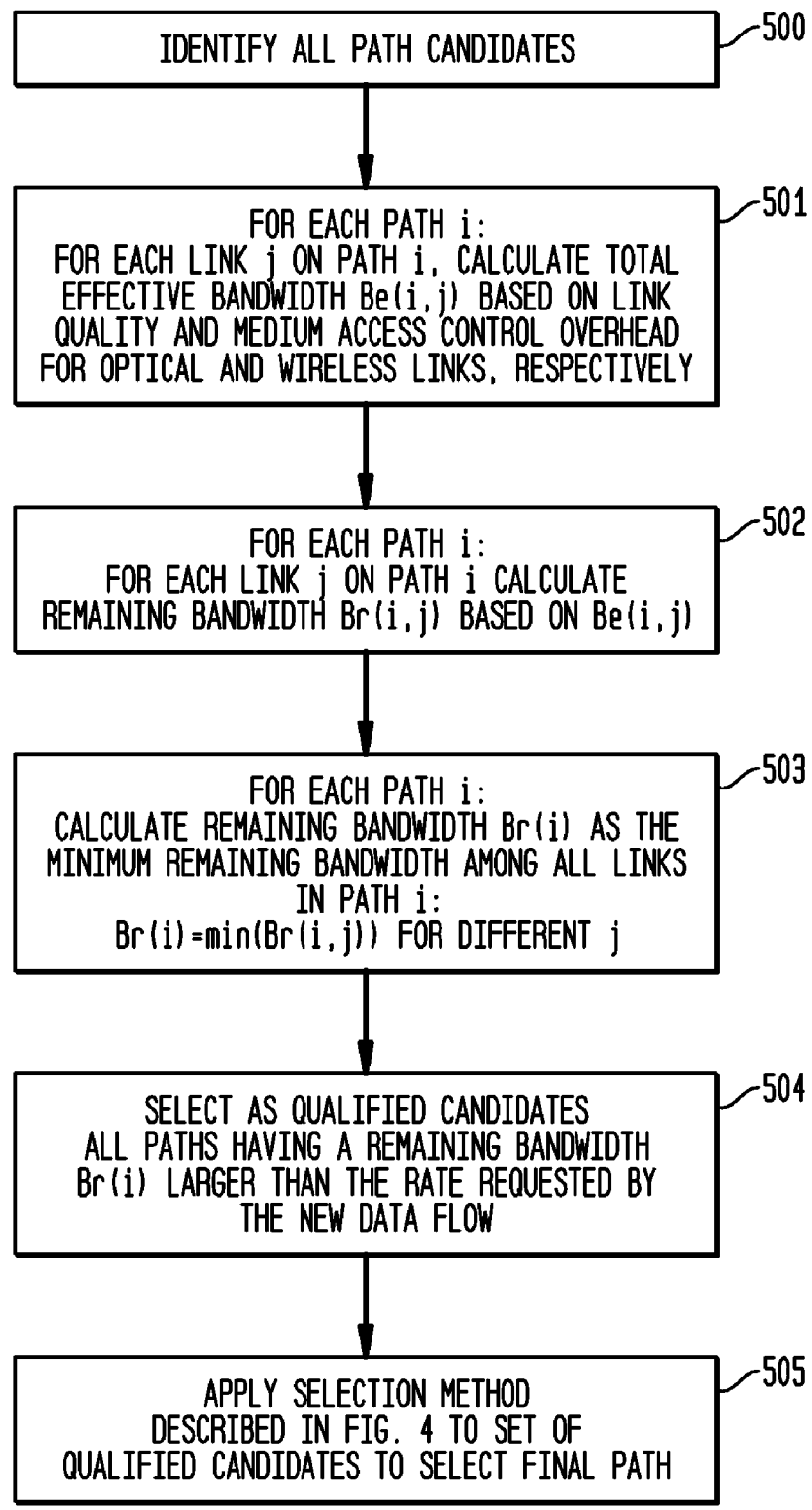
FIG. 5 is a flowchart depicting another method to transmit information in a communication system, in accordance with an embodiment of the invention.

FIG. 5 is a flowchart depicting a method to transmit information in communication system 100, in accordance with an embodiment of the invention. At step 500, all path candidates are identified. At step 501, for each path i, the following is performed: for each link j on the respective path i, the Total Effective Bandwidth Be(i,j) is calculated based on link quality and Medium Access Control overhead for optical and wireless links, respectively. At step 502, for each path i, the following is performed: for each link j on the respective path i, the remaining bandwidth Br(i,j) is calculated based on Be(i,j). In one example, Br(i,j)=Be(i,j)−ΣR(i,j,f), as discussed above. At step 503, for each path i, the remaining bandwidth Br(i) is calculated as the minimum remaining bandwidth among all links in path i: Br(i)=min(Br(i,j)) for different j. At step 504, all paths having a remaining bandwidth Br(i) larger than the rate requested by the new data flow are selected as Qualified Candidates. A final path is determined based on characteristics of the paths in the set of Qualified Candidates. In the exemplary embodiment, at step 505, the selection method described in FIG. 4 is applied to the set of Qualified Candidates (as selected at step 504) to selected a final path. In other embodiments, a final path may be determined based on characteristics of the paths in the set of Qualified Candidates using other selection methods. Information, such as a signal, is transmitted via the final path.

In an embodiment of the invention, some or all of the steps described in FIG. 5 are performed by server 180. In some embodiments, the method steps described in FIG. 5 are defined by computer program instructions that are stored in memory 151 of server 180 and executed by processor 154. In one example, computer program instructions stored in memory 151 are implemented as computer executable code appropriately programmed by one skilled in the art to perform the algorithm defined by the method steps described in FIG. 5. By executing the computer program instructions, processor 154 executes the algorithm defined by the method steps of FIG. 5.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of transmitting information via a communication network that comprises a plurality of nodes and a plurality of links between nodes, the plurality of links comprising at least one optical link and at least one wireless link, the method comprising: determining, for each path in a first plurality of paths in said communication network, a respective first weighted path length based at least in part on a number of pure wireless links in the path; selecting, from among the first plurality of paths, a second plurality of paths having first weighted path lengths less than a threshold value; determining, for each path in the second plurality, a respective second weighted path length based at least in part on a number of pure optical links in the path; selecting, from among the second plurality of paths, a transmission path having a highest second weighted path length; and transmitting information via the transmission path.

2. The method of claim 1, wherein the communication network comprises a hybrid free-space optical/radio-frequency communication system.

3. The method of claim 1, wherein the plurality of nodes comprises: at least one node comprising an RF transceiver and an optical transmitter; at least one node comprising an RF transceiver and an optical receiver; and at least one node comprising an RF transceiver and an optical transceiver.

4. The method of claim 1, wherein the first weighted path length for a respective path equals w1*N(i)+(1−w1)*Nw(i), wherein w1 comprises a selected parameter, N(i) equals a total number of links in the respective path, and Nw(i) equals a number of pure wireless links in the respective path.

5. The method of claim 1, wherein the threshold value equals min(Lw(i))*(1+k), wherein Lw(i) equals the first weighted path length of the respective path and k comprises a selected parameter.

6. The method of claim 1, wherein the second weighted path length for a respective path equals w2*No(i)+(1−w2)*Now(i), wherein w2 comprises a selected parameter, No(i) equals a number of pure optical links in the respective path, and Now(i) equals a number of hybrid optical and wireless links in the respective path.

7. A method of transmitting information via a communication network that comprises a plurality of nodes and a plurality of links between nodes, the method comprising: for each path in a first plurality of paths in said communication network, performing the following steps: for each link in the respective path: determine a total effective link bandwidth value associated with the respective link; and determine a remaining link bandwidth value associated with the respective link, based on the total effective link bandwidth value associated with the respective link; and determine a remaining path bandwidth value associated with the respective path, based on the remaining link bandwidth values associated with the links in the respective path; selecting from the first plurality of paths a second plurality of paths having remaining path bandwidth values greater than a threshold value; selecting a transmission path from among the second plurality of paths based on one or more characteristics of the paths in the second plurality; and transmitting information via the selected transmission path.

8. The method of claim 1, wherein the communication network comprises a hybrid free-space optical/radio-frequency communication system.

9. The method of claim 7, wherein the remaining link bandwidth value associated with a respective link equals $Br(ij)=Be(ij)-\Sigma R(i,j,f)$, wherein $Be(i,j)$ equals the total effective link bandwidth value associated with the respective link and $R(i,j,f)$ is a data rate of a flow on the respective link.

10. The method of claim 9, wherein the remaining path bandwidth value associated with a respective path equals the minimum remaining link bandwidth value among all the links in the respective path.

11. The method of claim 10, wherein the threshold value equals a rate requested by a data flow.

12. The method of claim 7, wherein the step of selecting a transmission path from among the second plurality of paths based on one or more characteristics of the paths in the second plurality comprises the following steps: determining, for each path in the second plurality of paths, a respective first weighted path length based at least in part on a number of pure wireless links in the path; selecting, from among the second plurality of paths, a third plurality of paths having first weighted path lengths less than a threshold value; determining, for each path in the third plurality, a respective second weighted path length based at least in part on a number of pure optical links in the path; and selecting, from among the third plurality of paths, a transmission path having a highest second weighted path length.

13. The method of claim 12, wherein the first weighted path length for a respective path equals $w1*N(i)-(1-w1)*Nw(i)$, wherein w1 comprises a first predetermined parameter, $N(i)$ equals a total number of links in the respective path, and $Nw(i)$ equals a number of pure wireless links in the respective path.

14. The method of claim 13, wherein the threshold value equals $\min(Lw(i))*(1+k)$, wherein $Lw(i)$ equals the first weighted path length of the respective path and k comprises a second predetermined parameter.

15. The method of claim 14, wherein the second weighted path length for a respective path equals $w2*No(i)-(1-w2)*Now(i)$, wherein w2 comprises a third predetermined parameter, $No(i)$ equals a number of pure optical links in the respective path, and $Now(i)$ equals a number of hybrid optical and wireless links in the respective path.

16. An apparatus for transmitting information via a communication network that comprises a plurality of nodes and a plurality of links between nodes, the plurality of links comprising at least one optical link and at least one wireless link, the apparatus comprising: means for determining, for each path in a first plurality of paths in said communication network, a respective first weighted path length based at least in part on a number of pure wireless links in the path; means for selecting, from among the first plurality of paths, a second plurality of paths having first weighted path lengths less than a threshold value; means for determining, for each path in the second plurality, a respective second weighted path length based at least in part on a number of pure optical links in the path; means for selecting, from among the second plurality of paths, a transmission path having a highest second weighted path length; and means for transmitting information via the transmission path.

17. The apparatus of claim 16, wherein the communication network comprises a hybrid free-space optical/radio-frequency communication system.

18. The apparatus of claim 16, wherein the plurality of nodes comprises: at least one node comprising an RF transceiver and an optical transmitter; at least one node comprising an RF transceiver and an optical receiver; and at least one node comprising an RF transceiver and an optical transceiver.

19. The apparatus of claim 16, wherein the first weighted path length for a respective path equals $w1*N(i)-(1-w1)*Nw(i)$, wherein w1 comprises a selected parameter, $N(i)$ equals a total number of links in the respective path, and $Nw(i)$ equals a number of pure wireless links in the respective path.

20. The apparatus of claim 16, wherein the second weighted path length for a respective path equals $w2*No(i)-(1-w2)*Now(i)$, wherein w2 comprises a selected parameter, $No(i)$ equals a number of pure optical links in the respective path, and $Now(i)$ equals a number of hybrid optical and wireless links in the respective path.

* * * * *